(12) United States Patent
Anderson

(10) Patent No.: US 10,919,625 B2
(45) Date of Patent: Feb. 16, 2021

(54) RECONFIGURABLE UNMANNED AERIAL VEHICLES FOR SUBSURFACE SENSOR DEPLOYMENT

(71) Applicant: The Boeing Company, Chicago, IL (US)

(72) Inventor: Erin Kathleen Anderson, New Orleans, LA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 16/043,973

(22) Filed: Jul. 24, 2018

(65) Prior Publication Data
US 2020/0031466 A1 Jan. 30, 2020

(51) Int. Cl.
*B64C 39/02* (2006.01)
*G01V 1/16* (2006.01)
*G01V 3/12* (2006.01)

(52) U.S. Cl.
CPC ...... *B64C 39/024* (2013.01); *B64C 2201/024* (2013.01); *B64C 2201/12* (2013.01); *B64C 2201/18* (2013.01); *G01V 1/168* (2013.01); *G01V 3/12* (2013.01)

(58) Field of Classification Search
CPC ................................. B64C 39/024; B64F 1/32
See application file for complete search history.

(56) References Cited

U.S. PATENT DOCUMENTS

| 1,749,471 | A | * | 3/1930 | De Bothezat | B64C 27/08 416/130 |
| 9,004,973 | B2 | * | 4/2015 | Condon | A63F 13/235 446/37 |
| 9,382,003 | B2 | * | 7/2016 | Burema | B64C 39/024 |
| 10,336,470 | B2 | * | 7/2019 | Fisher | B64F 1/04 |
| 2013/0068892 | A1 | * | 3/2013 | Bin Desa | B64C 39/024 244/190 |
| 2013/0161447 | A1 | * | 6/2013 | McGeer | B64F 1/02 244/110 F |
| 2016/0376031 | A1 | * | 12/2016 | Michalski | G08G 5/0026 701/15 |

* cited by examiner

*Primary Examiner* — Michael H Wang
(74) *Attorney, Agent, or Firm* — Duft & Bornsen, PC

(57) ABSTRACT

Embodiments herein describe a reconfigurable UAV to allow for the deployment of a subsurface sensor. The UAV includes a rotor assembly that is slidably coupled to a landing base. The rotor assembly includes a plurality of rotors and a ring circumscribing the rotors. Upon landing, the rotor assembly rotates in a first direction with respect to the landing base, which reduces a spacing between the rotor assembly and the ground and drives a sensor coupled to the rotor assembly into the ground. To remove the sensor from the ground, the rotor assembly rotates in a second direction to increase the spacing between the rotor assembly and the ground. The ring and/or the landing base may include interlocking features such as helical threads that are utilized to translate a rotational motion of the rotor assembly into a linear translation of the rotor assembly along the length of the landing base.

20 Claims, 6 Drawing Sheets

RECONFIGURABLE UNMANNED AERIAL VEHICLES FOR SUBSURFACE SENSOR DEPLOYMENT

FIELD

This disclosure relates to the field of Unmanned Aerial Vehicles (UAVs) and in particular, to utilizing reconfigurable UAVs for subsurface sensor deployment.

BACKGROUND

A UAV is an aircraft that does not include a human pilot onboard. UAVs are sometimes referred to as drones. UAVs include onboard controllers along with communication capabilities that allow a remote operator (e.g., the ground pilot) the ability to control the UAV during flight operations. Multi-rotor UAVs (e.g., quadcopters) utilizes a plurality of rotors to supply lift to the UAV.

In some cases, UAVs are utilized to deploy subsurface sensors. For example, a UAV may fly over an area and drop a subsurface sensor on the ground, or the UAV may include a subsurface sensor that is placed in the ground when the UAV is intentionally crashed into the ground. In either case, it may be difficult to ensure that the subsurface sensor is deployed correctly in order to return useful data from the subsurface sensor. Further, neither case allows for the subsurface sensor to be retrieved.

Therefore, there is a need to improve the deployment of subsurface sensors using UAVs.

SUMMARY

Embodiments herein describe a UAV that is reconfigurable to allow for the deployment of a subsurface sensor. The UAV includes a rotor assembly that is slidably coupled to a landing base. The rotor assembly includes a plurality of rotors and a ring circumscribing the plurality or rotors. Upon landing, the rotor assembly rotates in a first direction with respect to the landing base, which reduces a spacing between the rotor assembly and the ground and drives a sensor coupled to the rotor assembly into the ground. To remove the sensor from the ground, the rotor assembly rotates in a second direction to increase the spacing between the rotor assembly and the ground. The ring and/or the landing base may include interlocking features such as helical threads that are utilized to translate a rotational motion of the rotor assembly into a linear translation of the rotor assembly along the length of the landing base.

One embodiment comprises a UAV. The UAV includes a rotor assembly and a landing base. The rotor assembly includes a plurality of rotors utilized to provide propulsion to the UAV and a ring circumscribing the plurality of rotors. The landing base is slidably coupled to the ring and is configured to transition the rotor assembly along a length of the landing base in response to rotation of the rotor assembly with respect to the landing base.

Another embodiment comprises a method of deploying a sensor with a UAV. The method comprises landing the UAV on the ground, where the UAV includes a rotor assembly and a landing base, the rotor assembly comprising a plurality of rotors and a ring circumscribing the plurality of rotors, the landing base slidably coupled to the ring. The method further comprises rotating the rotor assembly in a first direction to transition the rotor assembly along a length of the landing base towards the ground. The method further comprises pushing a sensor coupled to the rotor assembly in the ground in response to rotating the rotor assembly in the first direction.

Another embodiment comprises a UAV. The UAV includes a rotor assembly and a landing base. The rotor assembly includes a plurality of rotors utilized to provide torque to the rotor assembly and a threaded ring circumscribing the plurality of rotors. The landing base includes a plurality of threaded pillars slidably coupled to the threaded ring, where the plurality of rotors is configured to generate the torque and rotate the rotor assembly, where a coupling between the threaded ring and the threaded pillars is configured to translate rotation of the rotor assembly into a linear motion along a length of the plurality of threaded pillars.

is slidably coupled to the threaded ring and is configured to transition the rotor assembly along a length of the threaded landing base in response to rotation of the rotor assembly with respect to the threaded landing base.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
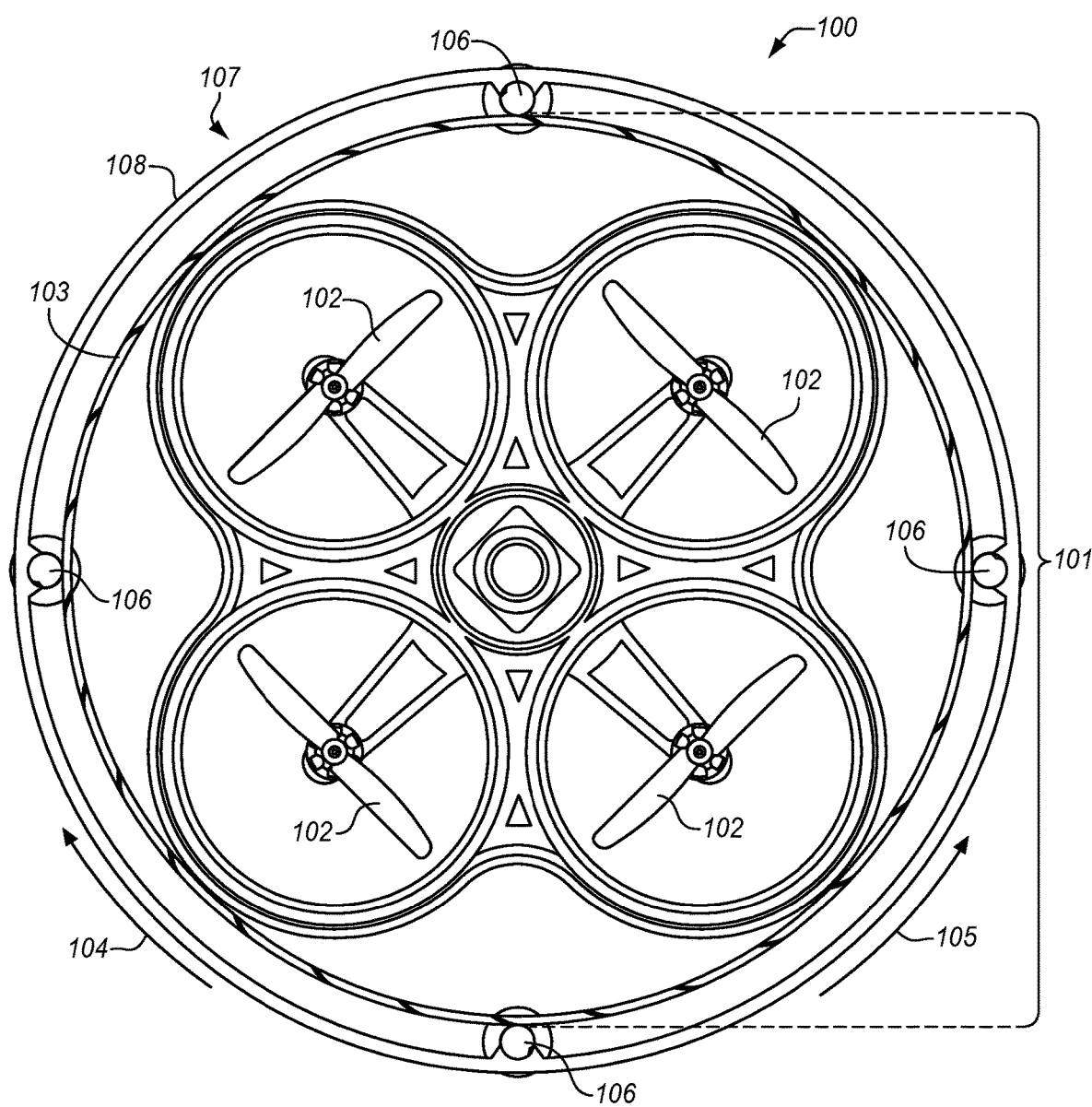
FIG. 1 is a top view of UAV in an illustrative embodiment.

FIG. 1 illustrates a top view of a UAV 100 in an illustrative embodiment. In this embodiment, UAV 100 is illustrated as a quadcopter having a particular configuration, although UAV 100 may have a different configuration in other embodiments. In this embodiment, UAV 100 includes a rotor assembly 101 that is slidably coupled to a landing base 107. Rotor assembly 101 includes a plurality of rotors 102 and a ring 103 that circumscribes rotors 102. Rotors 102 are coupled to motors (not shown in FIG. 1) and provide thrust and torque to UAV 100. Rotor assembly 101 in FIG. 1 rotates both clockwise direction 104 and counter-clockwise direction 105 with respect to landing base 107 and translates along a length of landing base 107 (into or out of the page in FIG. 1). In this embodiment, landing base 107 includes a plurality of pillars 106 that are coupled to an outer ring 108. Ring 103 may include grooves, threads, or other features that mate with grooves, threads, or other features in landing base 107 (e.g., grooves or threads fabricated into pillars 106).

Pillars 106 in FIG. 1 have a length that is into the page in FIG. 1. When rotor assembly 101 rotates, rotor assembly 101 transition along the length of pillars 106 utilizing grooves (not shown in FIG. 1) in pillars 106. For instance, as rotor assembly 101 rotates in the clockwise direction 104, rotor assembly 101 may travel into the page with respect to FIG. 1. As rotor assembly 101 rotates in the counter-clockwise direction 105, rotor assembly 101 may travel out of the page with respect to FIG. 1.

Figure 2:
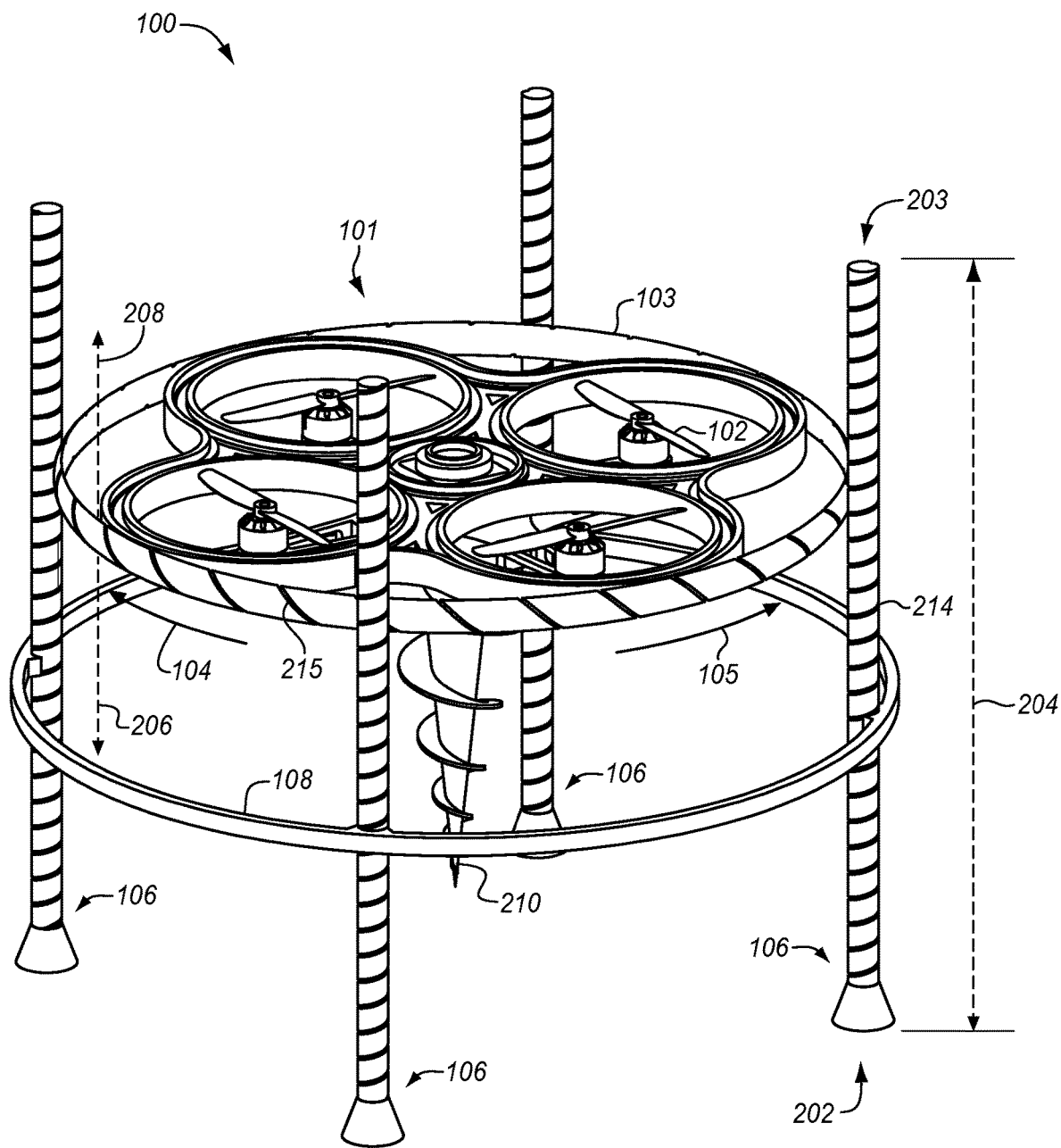
FIG. 2 is a perspective view of the UAV of FIG. 1 in an illustrative embodiment.

FIG. 2 illustrates a perspective view of UAV 100 in an illustrative embodiment. In FIG. 2, pillars 106 of landing base 107 have a first end 202 and a second end 203 separated by a length 204. As rotor assembly 101 rotates, threads 215 in ring 103 couple with threads 214 in pillars 106, which translate the rotation of rotor assembly 101 into a linear motion along length 204 of pillars 106.

As rotor assembly 101 rotates in the clockwise direction 104, rotor assembly 101 may travel in the direction indicated by arrow 206 towards first end 202. Landing base 107 may be prevented from rotating along with rotor assembly 101 when first end 202 of pillars 106 is located on the ground. The ground in this case operates to secure landing base 107 from rotating with respect to rotor assembly 101. In another example, as rotor assembly 101 rotates in the counter-clockwise direction 105, rotor assembly 101 may travel in the direction indicated by arrow 208 towards second end 203 of pillars 106. When UAV 100 has landed with first end 202 proximate to the ground, rotation of rotor assembly 101 drives rotor assembly 101 toward first end 202, which pushes a sensor 210 coupled to rotor assembly 101 into the ground. Sensor 210 may comprise any component, system, or device that performs subsurface sensing. For instance, sensor 210 may sense vibrations, temperatures, electromagnetic energy, humidity, conductivity, etc. In some embodiments, sensor 210 has the shape of an auger. The use of an auger shape for sensor 210 allows sensor 210 to burrow into the ground as rotor assembly 101 rotates.

When UAV 100 is in flight, a locking mechanism (not shown) may secure ring 103 and landing base 107 together, which prevents rotor assembly 101 from rotating with respect to landing base 107. The locking mechanism may include pins, friction locks, or other components or devices that prevent rotor assembly 101 from rotating with respect to landing base 107. In the flight position of UAV 100, sensor 210 is retracted away from first end 202 of pillars 106.

Figure 3:
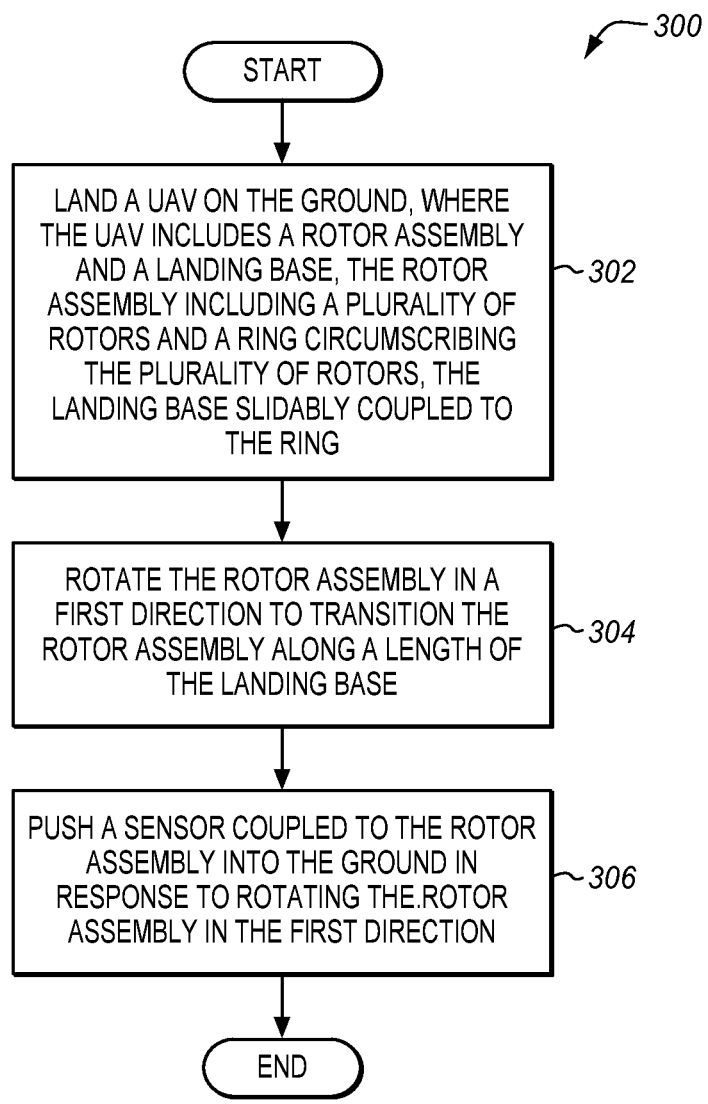
FIG. 3 is a flow chart of a method for deploying a subsurface sensor using the UAV of FIG. 1 in an illustrative embodiment.

FIG. 3 illustrates a method 300 of deploying a subsurface sensor utilizing a UAV in an illustrative embodiment. The methods illustrated herein will be described with respect to UAV 100, although the methods may apply to other UAVs, not shown. The steps of the methods illustrated herein are not all inclusive, and may include other steps, not shown. Further, the steps may be performed in an alternate order.

Figure 4:
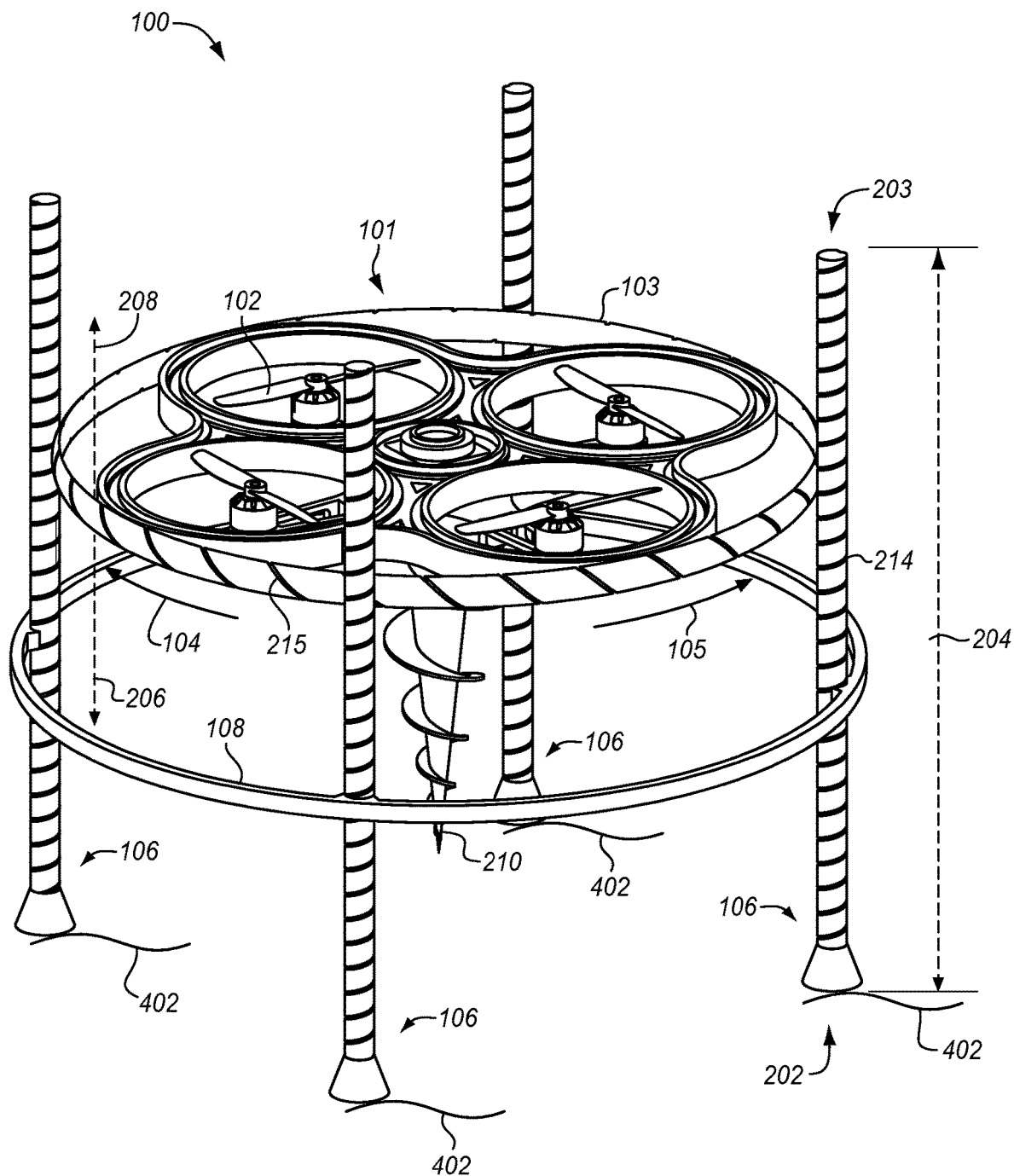
FIG. 4 is a perspective view of the UAV of FIG. 1 as configured for flight in an illustrative embodiment.

UAV 100 lands on the ground (see step 302). FIG. 4 illustrates UAV 100 landed on the ground 402 in an illustrative embodiment. Prior to driving sensor 210 into the ground 402, the locking mechanism (not shown) may release to allow rotor assembly 101 to rotate with respect to landing base 107. As rotor assembly 101 rotates (e.g., in the clockwise direction 104), rotor assembly 101 travels down pillars 106 towards the ground 402 in the direction of arrow 206 (see step 304). While traveling in the direction of arrow 206 along pillars 106, rotor assembly 101 travels towards first end 202 of pillars 106 and pushes sensor 210 into the ground 402 (see step 306). In some embodiments, UAV 100 may tilt rotors 102 out of a plane formed by ring 103 in order to generate torque and rotate rotor assembly 101. For instance, rotors 102 may tilt to a non-horizontal orientation (e.g., ninety degrees) to generate a rotational force that rotates rotor assembly 101.

Figure 5:
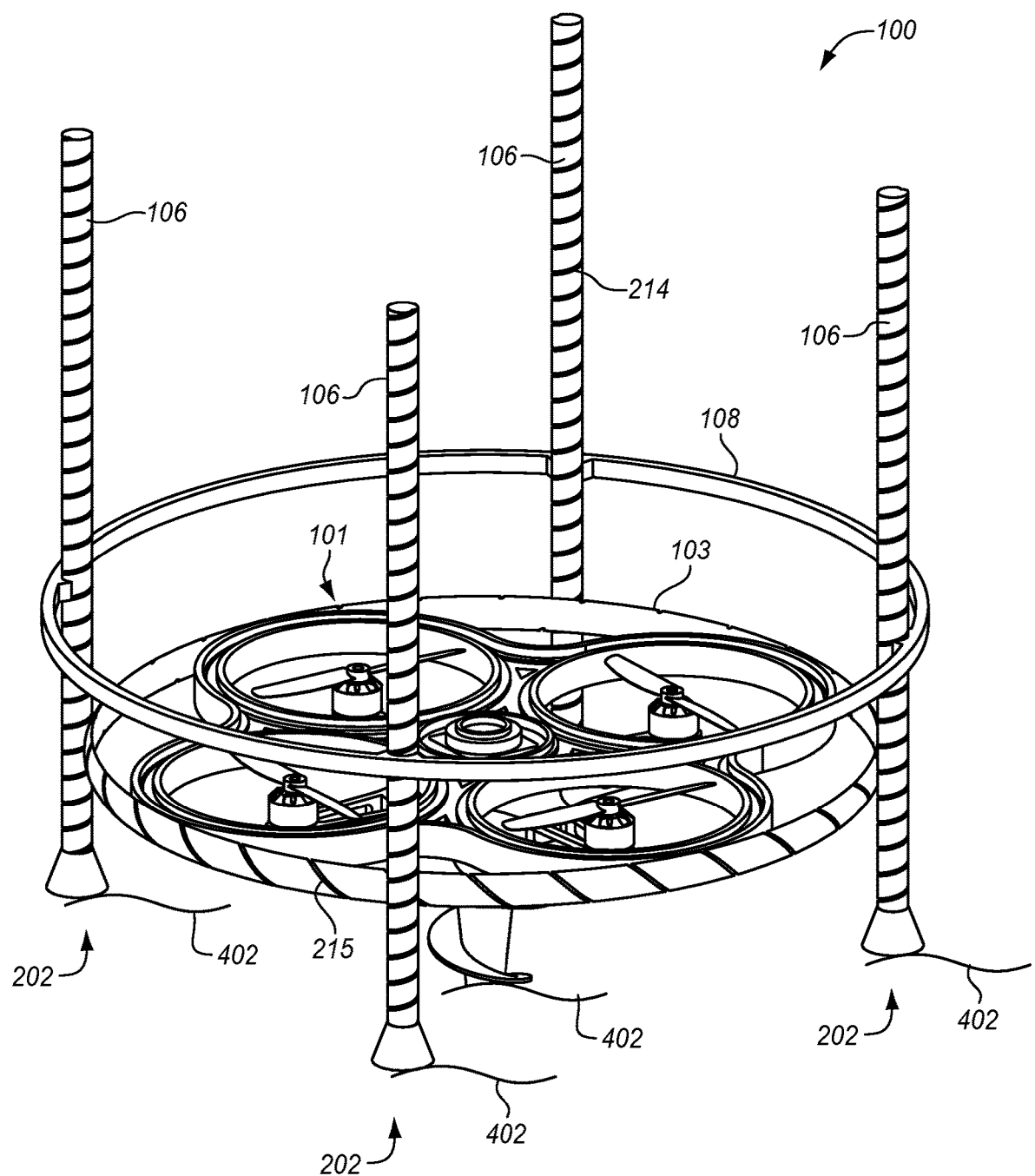
FIG. 5 is a perspective view of the UAV of FIG. 1 as configured to deploy a sensor in an illustrative embodiment.

FIG. 5 illustrates UAV 100 with sensor 210 pushed into the ground 402 in an illustrative embodiment. With sensor 210 in the ground 402, UAV 100 may receive data from sensor 210 and store and/or forward the data to a remote location for analysis.

Figure 6:
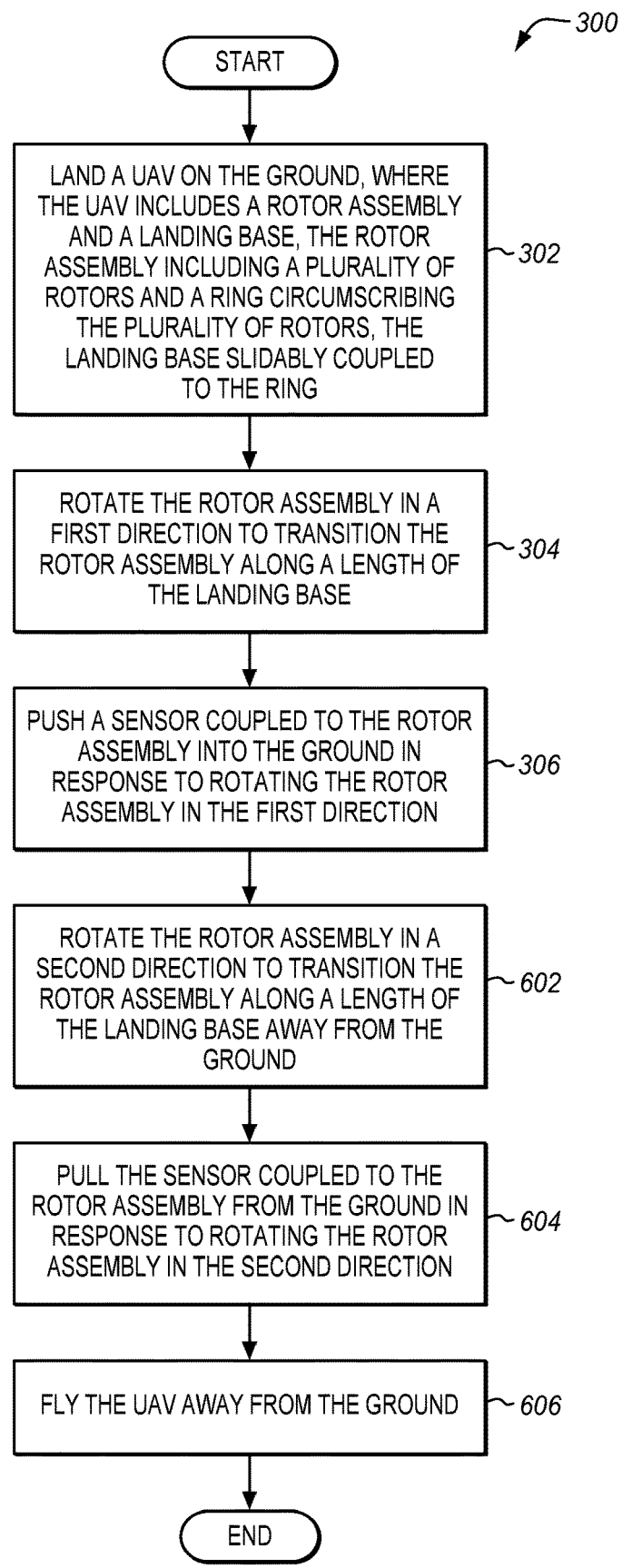
FIG. 6 illustrates additional steps of the method of FIG. 3 in an illustrative embodiment.

In order to fly UAV 100 to another location and provide subsurface sensing capabilities, rotor assembly 101 rotates in a second direction (e.g., in the counter-clockwise direction 105) to transition rotor assembly 101 along pillars 106 away from the ground 402 (see step 602 of FIG. 6). As rotor assembly 101 transitions away from the ground 402, sensor 210 is pulled from the ground 402 (see step 604). UAV 100 may activate a locking mechanism in some embodiments to secure ring 103 to pillars 106. UAV 100 may then fly away from ground 402 and travel to anther location prior to deploying sensor 210 again (see step 606 and FIG. 2).

In some embodiments, UAV 100 may detach sensor 210 and leave sensor 210 in the ground 402. For instance, sensor 210 may include power storage, data storage, and/or Radio Frequency (RF) capabilities to enable sensor 210 transmit data to UAV 100 and/or remote locations. When sensor 210 is detached, UAV 100 may fly away and return at a later time to retrieve sensor 210 using the same or similar steps described for deploying sensor 210.

UAV 100 allows for the remote deployment of subsurface sensors utilizing a unique re-configuration capability that enables UAV 100 to land, drive a subsurface sensor into the ground, and then either detach the subsurface sensor and fly away, or retrieve the subsurface sensor from the ground and fly away. This and other features of UAV 100 allows for the deployment of subsurface sensors without the risks associated with simply dropping the subsurface sensors or crashing the UAV into the ground to deploy the subsurface sensors.

Although specific embodiments were described herein, the scope is not limited to those specific embodiments. Rather, the scope is defined by the following claims and any equivalents thereof.

What is claimed is:

1. An apparatus, comprising:
   an Unmanned Aerial Vehicle (UAV) comprising a main body that includes a plurality of rotors utilized to provide propulsion to the UAV and a ring circumscribing the plurality of rotors that includes first threads along an outer perimeter of the ring; and
   a landing base including second threads engaged with the first threads of the ring, wherein the first threads and the second threads are configured to transition the main body along a length of the landing base in response to rotation of the main body with respect to the landing base.

2. The apparatus of claim 1, wherein:
   the landing base include a first end and a second end that is separated by the length;

the landing base is configured to transition the main body along the length towards the first end in response to rotation of the main body in a first direction; and the landing base is configured to transition the main body along the length towards the second end in response to rotation of the main body in a second direction.

3. The apparatus of claim 2, further comprising:
a sensor coupled to the main body that extends from the main body towards the first end of the landing base.

4. The apparatus of claim 3, wherein:
the sensor has a shape of an auger.

5. The apparatus of claim 3, wherein:
rotation of the main body in the first direction moves the sensor toward the first end of the landing base.

6. The apparatus of claim 5, wherein:
rotation of the main body in the second direction moves the sensor away from the first end of the landing base.

7. The apparatus of claim 1, wherein:
the plurality of rotors is configured to tilt to generate torque and rotate the main body with respect to the landing base.

8. The apparatus of claim 1, wherein:
the landing base comprises a plurality of pillars coupled to the ring utilizing the first threads and the second threads.

9. A method, comprising:
landing an apparatus on ground, wherein the apparatus includes an Unmanned Aerial Vehicle (UAV) and a landing base, wherein the UAV includes a main body comprising a plurality of rotors and a ring circumscribing the plurality of rotors that includes first threads along an outer perimeter of the ring, wherein the landing base includes second threads engaged with the first threads of the ring;

rotating the main body in a first direction to engage the first threads with the second threads and transition the main body along a length of the landing base towards the ground; and pushing a sensor coupled to the main body into the ground in response to rotating the main body in the first direction.

10. The method of claim 9, further comprising:
rotating the main body in a second direction to engage the first threads with the second threads and transition the main body along the length of the landing base away from the ground;

pulling the sensor from the ground in response to rotating the main body in the second direction; and flying the UAV away from the ground.

11. The method of claim 9, further comprising:
detaching the sensor from the main body in response to pushing the sensor into the ground.

12. An apparatus, comprising:
an Unmanned Aerial Vehicle (UAV) comprising a main body that includes a plurality of rotors utilized to provide torque to the main body and a ring circumscribing the plurality of rotors; and a landing base comprising a plurality of pillars coupled to the ring and a coupler between the ring and the plurality of pillars, wherein the plurality of rotors is configured to generate the torque and rotate the main body with respect to the landing base, wherein the coupler between the ring and the pillars is configured to translate rotation of the main body into a linear motion along a length of the plurality of pillars utilizing at least one of interlocking grooves in the ring and the plurality of pillars and interlocking threads in the ring and the plurality of pillars.

13. The apparatus UAV of claim 12, wherein:
the plurality of pillars includes a first end and a second end that are separated by the length of the plurality of pillars;

rotation of the main body in a first direction transitions the main body along the length of the plurality of pillars towards the first end; and rotation of the main body in a second direction transitions the main body along the length of the plurality of pillars towards the second end.

14. The apparatus of claim 13, further comprising:
a sensor coupled to the main body that extends from the main body towards the first end of the plurality of pillars.

15. The apparatus of claim 14, wherein:
the sensor has a shape of an auger.

16. The apparatus of claim 14, wherein:
rotation of the main body in the first direction moves the sensor towards the first end of the plurality of pillars.

17. The apparatus of claim 16, wherein:
rotation of the main body in the second direction moves the sensor away from the first end of the plurality of pillars.

18. The apparatus of claim 12, wherein:
the plurality of rotors is configured to tilt out of a plane of the ring to generate the torque.

19. The apparatus of claim 12, wherein:
the coupler comprises interlocking grooves in the ring and the plurality of pillars.

20. The apparatus of claim 12, wherein:
the coupler comprises interlocking threads in the ring and the plurality of pillars.

* * * * *